United States Patent
Katz et al.

(10) Patent No.: US 12,542,805 B2
(45) Date of Patent: Feb. 3, 2026

(54) DETECTING AND MITIGATING BLUETOOTH BASED ATTACKS

(71) Applicant: Red Bend Ltd., Hod Ha'Sharon (IL)

(72) Inventors: Jonathan Katz, Lod (IL); Shachar Mendelowitz, Hertzeliya (IL); Ori Goldberg, Kiryat Ono (IL); Yosef Golan, Tel Aviv (IL)

(73) Assignee: RED BEND LTD., Hod Hasharon (IL)

( * ) Notice: Subject to any disclaimer, the term of this patent is extended or adjusted under 35 U.S.C. 154(b) by 142 days.

(21) Appl. No.: 18/560,668

(22) PCT Filed: May 4, 2022

(86) PCT No.: PCT/IL2022/050466
§ 371 (c)(1),
(2) Date: Nov. 13, 2023

(87) PCT Pub. No.: WO2022/238990
PCT Pub. Date: Nov. 17, 2022

(65) Prior Publication Data
US 2024/0250983 A1    Jul. 25, 2024

(30) Foreign Application Priority Data

May 12, 2021    (IL) .......................................... 283162

(51) Int. Cl.
*H04W 12/122* (2021.01)
*H04L 9/40* (2022.01)

(52) U.S. Cl.
CPC ...... *H04L 63/1441* (2013.01); *H04L 63/1416* (2013.01); *H04L 63/1433* (2013.01)

(58) Field of Classification Search
CPC ............. H04L 63/1441; H04L 63/1416; H04L 63/1433
(Continued)

(56) References Cited

U.S. PATENT DOCUMENTS 7,490,350 B1    2/2009  Murotake et al.
10,437,988 B1 * 10/2019  Newstadt ................ G06F 21/52
(Continued)

FOREIGN PATENT DOCUMENTS

CA    2424352 A1    12/2001
WO    2022238990 A1    11/2022

OTHER PUBLICATIONS

International Bureau of WIPO, International Preliminary Report on Patentability Issued in Application No. PCT/IL2022/050466, Nov. 23, 2023, WIPO, 6 pages.
(Continued)

*Primary Examiner* — Haresh N Patel
(74) *Attorney, Agent, or Firm* — McCoy Russell LLP

(57) ABSTRACT

Disclosed herein are methods and devices for mitigating Bluetooth (BT) based attacks, using a BT proxy device comprising a first and a second BT interfaces. The BT proxy device is configured to identify a first BT device and a second BT device connected to each other via a BT link, transmit a BT link disconnect to the first and second BT devices while using the device name of the second and first BT devices respectively, use the device name of the second BT device to connect to the first BT device via the first BT interface, use the device name of the first BT device to connect to the second BT device via the second BT interface, intercept BT packets exchanged between the first and the second BT devices, and detect one or more potential attack vectors based on analysis of one or more of the intercepted BT packets.

14 Claims, 8 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 10,464,675 | B1* | 11/2019 | Rabii | G08C 17/02 |
| 10,609,030 | B1* | 3/2020 | Newstadt | H04W 12/122 |
| 11,177,955 | B2* | 11/2021 | Jacobs | H04L 9/3073 |
| 2009/0068946 | A1* | 3/2009 | Amendola | H04L 63/1458 455/411 |
| 2015/0280843 | A1* | 10/2015 | Fucci | G06F 21/32 455/41.2 |
| 2016/0099963 | A1 | 4/2016 | Mahaffey et al. | |
| 2017/0263062 | A1* | 9/2017 | Bergerhoff | B60R 25/04 |
| 2018/0124096 | A1 | 5/2018 | Schwartz et al. | |
| 2018/0130275 | A1* | 5/2018 | Odejerte, Jr. | H04W 4/80 |
| 2020/0037157 | A1* | 1/2020 | Agarwal | H04W 12/106 |
| 2020/0112584 | A1 | 4/2020 | Schwartz et al. | |

OTHER PUBLICATIONS

Bermejo, C. et al., "Notice of Retraction: Steal Your Life Using 5 Cents: Hacking Android Smartphones with NFC Tags," Proceedings of the 2020 IEEE International Conference on Pervasive Computing and Communications Workshops (PerCom Workshops), Mar. 23, 2020, Austin, Texas, 7 pages.

Elmannai, W. et al., "A Highly Secure Platform that Supports Smart Locks," Proceedings of the 2020 IEEE Canadian Conference on Electrical and Computer Engineering (CCECE), Aug. 30, 2020, London, Ontario, Canada, 6 pages.

European Patent Office, Extended European Search Report Issued in Application No. 22806970.4, Jan. 16, 2025, Germany, 19 pages.

Antoniolo, D. et al., "BIAS: Bluetooth Impersonation Attacks," Proceedings of the 2020 IEEE Symposium on Security and Privacy (SP), May 18, 2020, San Francisco, California, 14 pages.

ISA Israel Patent Office, International Search Report and Written Opinion Issued in Application No. PCT/IL2022/050466, Jul. 27, 2022, WIPO, 9 pages.

Yaseen, M. et al., "MARC: A Novel Framework for Detecting MITM Attacks in eHealthcare BLE Systems," Journal of Medical Systems, vol. 43, No. 11, Oct. 16, 2019, 18 pages.

Bennett, B. et al., "Security Platform for Mobile OS," Proceedings of the 2019 International Conference on Advancements in Computing (ICAC), Dec. 5, 2019, Malabe, Sri Lanka, 6 pages.

European Patent Office, Partial Supplementary European Search Report Issued in Application No. 22806970.4, Sep. 13, 2024, Germany, 19 pages.

* cited by examiner

DETECTING AND MITIGATING BLUETOOTH BASED ATTACKS

CROSS-REFERENCE TO RELATED APPLICATIONS

The present application is a U.S. National Phase of International Application No. PCT/IL2022/050466, entitled "DETECTING AND MITIGATING BLUETOOTH BASED ATTACKS", and filed on May 4, 2022. International Application No. PCT/IL2022/050466 claims priority to Israeli Provisional Application No. 283162, entitled "DETECTION SYSTEM OF BLUETOOTH PRIVACY ATTACK IN ANDROID DEVICES", and filed on May 12, 2021. The entire contents of each of the above-listed applications are hereby incorporated by reference for all purposes.

BACKGROUND

Some embodiments described herein relate to detecting and mitigating Bluetooth (BT) based attacks, and, more specifically, but not exclusively, to using BT proxy devices to connected between potentially vulnerable BT device to detect and mitigate BT based attacks.

Due to BT simplicity, low energy consumption, high functionality and sufficient bandwidth for many close range applications, a plurality of devices such as client devices, for example, smartphones, tablets, laptops, and/or the like now support BT connectivity for connecting to nearby peripheral devices and gadgets, such as, for example, audio devices, wearable devices, In-Vehicle Infotainment (IVI) systems to name just a few.

Many of the BT device may execute popular Operating Systems (OS), for example, Android and/or the like having BT stacks which may include inherent BT vulnerabilities that could be maliciously exploited in attempt to compromise the BT devices themselves and moreover to compromise other BT devices paired and connected via BT links with the compromised BT devices.

SUMMARY

According to a first aspect described herein there is provided a method of mitigating Bluetooth (BT) based attacks, comprising using one or more processors of a BT proxy device comprising a first and second BT interfaces for identifying a first BT device and a second BT device connected to each other via a BT link, transmitting a BT link disconnect to the first BT device while using the device name of the second BT device, transmitting a BT link disconnect to the second BT device while using the device name of the first BT device, connecting to the first BT device, via the first BT interface, using the device name of the second BT device, connecting to the second BT device, via the second BT interface, using the device name of the first BT device, intercepting BT packets transmitted, post connection, by the second BT device to the first BT device, and detecting one or more potential attack vectors based on analysis of one or more of the intercepted BT packets.

According to a second aspect described herein there is provided a BT proxy device for mitigating Bluetooth (BT) based attacks, comprising a first BT interface, a second BT interface, and one or more processors coupled to the first and second BT interfaces. The one or more processors are adapted to execute code. The code comprising code instructions to identify a first BT device and of a second BT device connected to each other via a BT link, code instructions to transmit a BT link disconnect to the first BT device while using the device name of the second BT device, code instructions to transmit a BT link disconnect to the second BT device while using the device name of the first BT device, code instructions to connect to the first BT device, via the first BT interface, using the device name of the second BT device; code instructions to connect to the second BT device, via the second BT interface, using the device name of the first BT device, code instructions to intercept BT packets transmitted, post connection, by the second BT device to the first BT device, and code instructions to detect one or more potential attack vectors based on analysis of one or more of the intercepted BT packets.

According to a third aspect described herein there is provided a method of detecting a malware configured to exploit Bluetooth (BT) vulnerabilities, comprising using one or more processors for analyzing a program code of one or more applications executed by one or more BT devices, identifying program instructions for opening one or more logical channels via one or more BT links of the one or more BT devices, evaluating the opening of the one or more logical channels according to one or more BT vulnerability rules, determining, based on the evaluation, whether opening the one or more logical channels is a potential exploitation of one or more BT vulnerabilities, and issuing one or more notifications to report the potential exploitation of the one or more BT vulnerabilities.

According to a fourth aspect described herein there is provided a system for detecting a malware configured to exploit Bluetooth (BT) vulnerabilities, comprising one or more processors configured to execute a code. The code comprising code instructions to analyze a program code of one or more applications executed by one or more BT devices, code instructions to identify program instructions for opening one or more logical channel via one or more BT links of the one or more BT devices, code instructions to evaluate the opening of the one or more logical channels according to one or more BT vulnerability rules, code instructions to determine, based on the evaluation, whether opening the one or more logical channels is a potential exploitation of one or more BT vulnerabilities, and code instructions to issue one or more notifications to report the potential exploitation of the one or more BT vulnerabilities.

In an optional implementation form of the first and/or second aspects, the intercepted BT packets are forwarded to the first BT device in case the one or more potential attack vectors are not detected.

In an optional implementation form of the first and/or second aspects, one or more alerts indicating detection of the one or more potential attack vectors are generated in case the one or more potential attack vectors are detected.

In an optional implementation form of the first and/or second aspects, BT packets transmitted, post connection, by the first BT device to the second BT device are intercepted, and one or more potential attack vectors are detected based on analysis of one or more of the intercepted BT packets.

In a further implementation form of the first and/or second aspects, the one or more potential attack vectors comprise a request transmitted by the second BT device to open one or more logical channels via the BT link for controlling Short Message Service (SMS) messages of the second BT device.

In a further implementation form of the first and/or second aspects, controlling SMS messages of the second BT device comprise one or more actions of a group consisting of: instructing the second BT device to transfer one or more SMS messages received by the second BT device, instructing the second BT device to delete one or more SMS messages received by the second BT device, instructing the second BT device to transmit one or more SMS messages, and instructing the second BT device to delete one or more SMS messages transmitted by the second BT device.

In a further implementation form of the first and/or second aspects, the one or more potential attack vectors comprise a request transmitted by the second BT device to open one or more logical channels via the BT link for transferring one or more private data items from the second BT device.

In a further implementation form of the first, second, third and/or fourth aspects, the one or more private data items comprise one or more members of a group consisting of: a contact information, and/or a call log.

In a further implementation form of the first and/or second aspects, the analysis of the BT packets is conducted according to one or more BT vulnerability rules defining operations typical to potential exploitation of one or more BT vulnerabilities of the first BT device.

In a further implementation form of the first and/or second aspects, the one or more BT vulnerability rules comprise a request to control one or more SMS messages of the first BT device.

In a further implementation form of the first and/or second aspects, the one or more BT vulnerability rules comprise a request to open transfer one or more private data items from the first BT device.

In a further implementation form of the first and/or second aspects, the analysis of the BT packets is conducted based on one or more connection patterns identified during previous connections between the first BT device and the second BT device.

In a further implementation form of the first and/or second aspects, the first BT device and/or the second BT device are Android based devices executing Android OS.

In a further implementation form of the third and/or fourth aspects, the one or more BT devices are Android based devices executing Android OS.

In a further implementation form of the third and/or fourth aspects, the one or more BT vulnerability rules comprises opening the one or more logical channels for controlling SMS messages of the one or more BT device.

In a further implementation form of the third and/or fourth aspects, the one or more BT vulnerability rules comprise opening the one or more logical channels for transferring one or more private data items from the one or more BT devices.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which some embodiments described herein pertain. Although methods and materials similar or equivalent to those described herein can be used in the practice or testing of embodiments described herein, exemplary methods and/or materials are described below. In case of conflict, the patent specification, including definitions, will control. In addition, the materials, methods, and examples are illustrative only and are not intended to be necessarily limiting.

Implementation of the method and/or system of some embodiments described herein can involve performing or completing selected tasks automatically. Moreover, according to actual instrumentation and equipment of embodiments of the method and/or system described herein, several selected tasks could be implemented by hardware, by software or by firmware or by a combination thereof using an operating system.

For example, hardware for performing selected tasks according to some embodiments described herein could be implemented as a chip or a circuit. As software, selected tasks according to embodiments described herein could be implemented as a plurality of software instructions being executed by a computer using any suitable operating system. In an exemplary embodiment described herein, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars are shown by way of example and for purposes of illustrative discussion of embodiments described herein. In this regard, the description taken with the drawings makes apparent to those skilled in the art how embodiments described herein may be practiced.

In the drawings.

DETAILED DESCRIPTION

Figure 1:
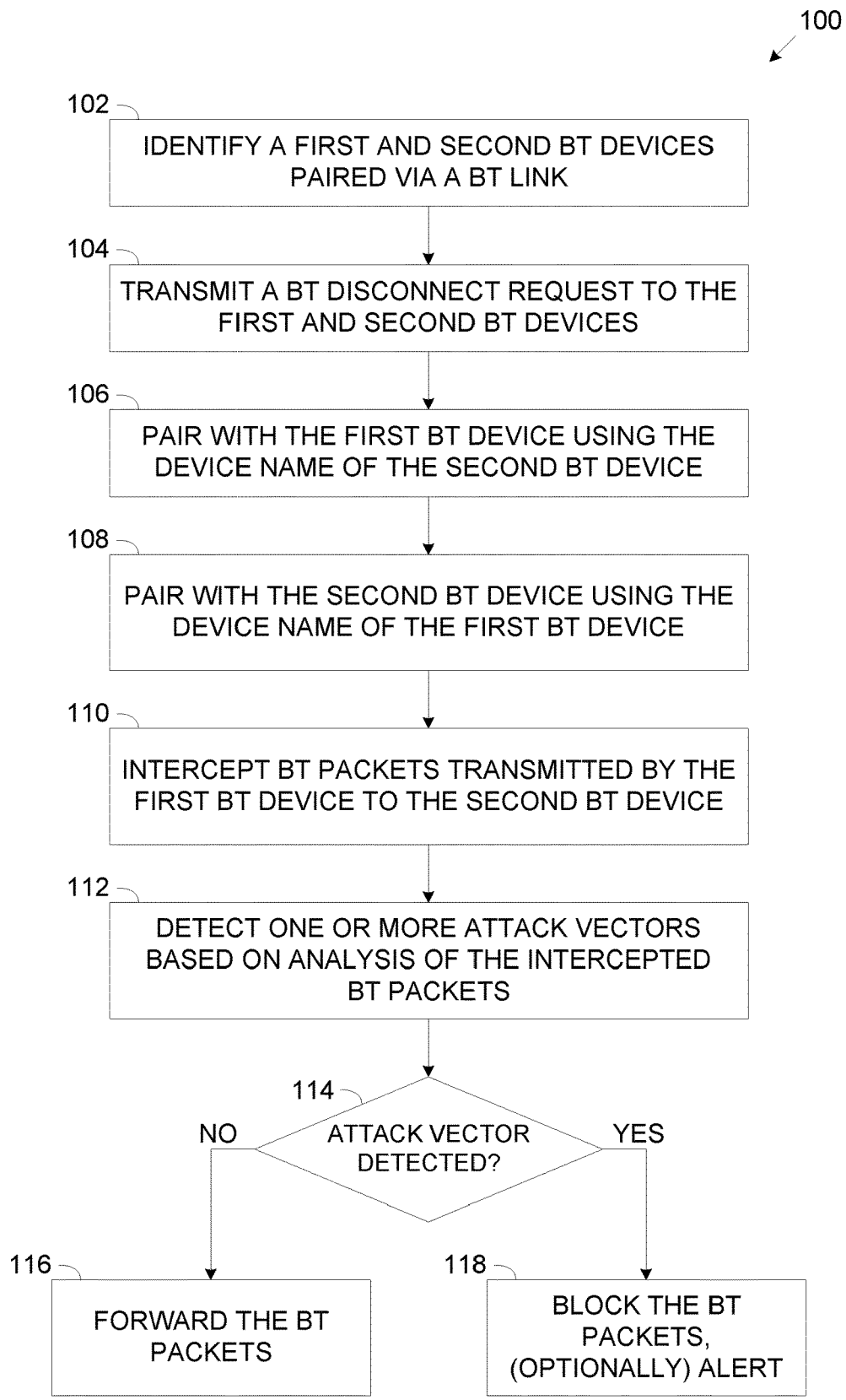
FIG. 1 is a flowchart of an exemplary process executed by a BT proxy device to detect and mitigate BT based attacks targeting one or more vulnerable BT devices, according to some embodiments described herein.

Some embodiments described herein relate to detecting and mitigating BT based attacks, and, more specifically, but not exclusively, to using BT proxy devices to connected between potentially vulnerable BT device to detect and mitigate BT based attacks.

While a plurality of devices support BT connectivity, the BT interface may present major vulnerabilities which may be exploited by malicious parties initiating attack vectors inn attempt to compromise the BT device, for example, acquire private data, gain access to restricted resources, hijack information and/or user accounts, launch ransom attacks and more.

Typically, the BT vulnerabilities may be inherent in the Operating Systems (OS) executed by the BT devices, for example, Android which is widely deployed in a plurality of BT devices. Such OS may include BT stacks having inherent BT vulnerabilities and may yet fail to apply sufficient security measures, provisions and/or restrictions on BT links of the BT devices with other BT devices in order to prevent exploitation of the BT vulnerabilities.

A first major BT vulnerability which is typical to the BT stack of the Android OS is the fact that security provisions and/or access restrictions relating to BT links and connections are applied only for the initial pairing of two BT devices which is the first time the two BT devices ever make a connection with each other. However, no such security provisions and/or access restrictions apply to subsequent pairing and connection events of the BT device with BT devices with which it already paired in the past. This means that once a BT device connected with permission of its associated user to another BT device, all subsequent pairing sessions between the two BT devices will be done automatically without explicit consent or even knowledge of the user.

Another BT vulnerability of the Android OS BT stack is the fact that BT pairing is managed globally for all applications executed by the BT device rather than per application basis. This means that in case a BT device previously paired with another BT device on behalf of a legitimate application, any other application executed by the BT device, including malicious applications may automatically pair and reconnect with the other BT device without informing the user or requesting permission to do so.

Yet another vulnerability existing in the Android BT stack is that paired BT devices which are connected to each other may automatically open any type of BT logical channel with each other without requesting the user's permission or informing him. As known in the art, one or more logical channel types may be opened via a BT link connecting two devices BT where each logical channel may be used for transfer and/or control of specific data, for example, music audio data, call audio, Short Message Service (SMS) message, other data items (e.g. calls history, contacts information, etc.). While the different logical channels may pose different risk and/or threat of a malicious attack there is no separate control over the logical channels. This means that opening a low risk logical channel via a BT link connecting two BT devices, for example, music transfer on behalf of a legitimate application, may enable one or more malicious applications to open high risk logical channels over BT link, for example, private data transfer, SMS transfer, delete, transmit control and/or the like which may be exploited to compromise one or more of the paired BT devices.

According to some embodiments described herein, there are provided methods, systems, devices and computer program products for real-time monitoring BT traffic exchanged between connected BT devices and mitigating potential attack vectors, specifically BT based attack vectors initiated by one or both of the BT devices exploiting one or more of the BT vulnerabilities in attempt to compromise the other BT device.

Specifically, a BT proxy device may be deployed to seamlessly get in between a pair of connected BT devices and monitor the BT packets exchanged between the two BT devices.

The BT proxy device may be configured to detect a BT link connecting two BT devices and issue a BT disconnect request to each of the two BT devices. In particular, the BT proxy device may impersonate as one of the two BT device when requesting the other BT device to disconnect. For example, the BT proxy device may use a device name of one BT device, which is broadcasted by the BT device to identify itself, when transmitting the BT disconnect request to the other BT and similarly, use the device name of the other BT device when transmitting the BT disconnect request to the first BT device.

In response to the BT disconnect requests, the two BT devices may disconnect the BT link between them.

The BT proxy device may then separately pair and connect to each of the two BT devices, each via a different BT interface of the BT proxy device. However, when connecting to the first BT device, the BT proxy device may impersonate as the second BT device by using the device name of the second BT device, and when connecting to the second BT device, the BT proxy device may impersonate as the first BT device by using the device name of the first BT device.

As result, each of the two BT devices may be connected to the BT proxy device via two separate BT links under the false presumption that they are connected directly to each other via a common BT link.

After paired and connected to the two BT devices, the BT proxy device may intercept BT packets transmitted from one BT device to the other device and may analyze the intercepted BT packets in order to identify one or more potential attack vectors.

The BT proxy device may analyze the intercepted BT packets and evaluate their content according to one or more vulnerability rules defining on one or more operation profiles of BT based attack vectors initiated in attempt to take advantage of the BT vulnerabilities of one or both of the BT devices, specifically the BT vulnerabilities inherent in the OS of the BT devices. The vulnerability rules may therefore define on one or more suspicious actions which are typical to the BT based attack vectors.

The suspicious actions may be indicative, for example, of one or more privacy attack vectors in which one BT device attempt to obtain private data stored in the other BT device. Such privacy attack indicative suspicious actions may comprise, for example, transferring one or more private data items between the BT devices, deleting one or more private data items, transferring seemingly unrelated private data, and/or the like.

In another example, the suspicious actions may be indicative of one or more identity theft attack vectors in which an attacker attempts to steal the identity of the user of one of the BT devices and use the stolen identity to gain access to one or more access restricted accounts of the user in one or more online services requiring user authentication, for example, an instant messaging service account, a texting service account, a social network account, a banking account, a credit card account, and/or the like. In particular, access to such accounts may be based on One Time Password (OTP) authentication where an OTP is transmitted to the user via the BT device. Such identity theft attack indicative suspicious actions may comprise, for example, instructing transmission of one or more SMS messages, instructing deletion of one or more SMS messages, and/or the like.

The BT proxy device may further analyze the intercepted BT packets and evaluate their content based on one or more typical connection patterns identified for the two connected BT devices during one or more past connections. In particular, the BT proxy device may identify a potential BT based attack vector by detecting deviation of one or more of the connected BT devices from their typical connection pattern(s).

In case, based on the analysis of the BT packets, the BT proxy device determines that no attack vector is detected, the BT proxy device may forward (transmit) the intercepted BT packets to the destination BT device. However, the BT proxy device may block one or more BT packets which are suspected to carry one or more BT attack vectors.

The BT proxy device may further alert one or more users of the potential BT based attack vector detected by the BT proxy device.

Deploying the BT proxy device to monitor in real time BT traffic between paired BT devices in order to detecting and mitigate potential BT based attack vectors designed and initiated to exploit the BT vulnerabilities in attempt to compromise BT devices may present major advantages and benefits.

First, as described herein before, the BT stack of popular OS which are widely used in a plurality of BT devices, for example, Android may introduce some major vulnerabilities which may be exploited may malicious parties to compromise these BT devices and gain access to private, sensitive, and/or/or restricted data and resources. Monitoring the traffic exchanged via the BT link connecting a BT device to a potentially malicious BT device to detect potential BT oriented attack vectors in real-time and mitigate these attacks may significantly reduce exposure, risk and/or threat of the BT based attacks to the BT devices and may thus significantly increase the BT devices' safety, security, privacy and/or robustness.

Moreover, monitoring and analyzing the BT traffic according to the vulnerability rules may significantly increase the efficiency of detecting potential BT based attack vectors since the knowledge of the BT vulnerabilities inherent the OS and BT stack of the BT devices may enable configuring the vulnerability rules to accurately define the operation profiles of such BT based attack vectors attempting to exploit the known BT vulnerabilities.

Furthermore, identifying and learning the connection patterns typical and characteristic to specific pairs of BT devices may enable the BT proxy device to adapt the BT traffic analysis to each specific pair of BT devices and thus efficiently detect deviations of the BT traffic exchanged between the respective pair from the typical patterns.

In addition, deploying the BT proxy device may eliminate the deployment of security measures in the BT devices themselves, for example, anti-malware, anti-virus, and/or the like, this may significantly reduce the computing resources consumed by the BT devices, for example, processing resources, storage resources, power (consumption) and/or the like. This may be highly desirable, in particular for protecting BT devices having limited computing resources and/or battery powered devices which are highly common.

According to some embodiments described herein, code analysis may be applied offline to analyze one or more software modules, designated applications hereinafter, executed by one or more BT devices in order to identify one or more potential BT based attack vectors embedded in the applications which may initiate when the applications are executed by the BT device in attempt to exploit one or more of the BT vulnerabilities inherent to the OS executed by the BT devices.

The applications, for example, an Android Package (APK) and/or the like may be analyzed, using one or more code analysis as known in the art, with respect to one or more of the BT vulnerability rules defining the suspicious actions which may be indicative of one or more of the BT based attack vectors. For example, the applications may be analyzed to identify program instructions configured to open one or more logical channels via one or more BT links with one or more other BT devices and instruct execution of one or more of the suspicious actions described herein before.

Offline analysis of software code, i.e., applications designed for execution by the BT device may enable detecting, in advance, potential BT based attack vectors embedded in the applications. Moreover, analyzing the applications according to the vulnerability rules accurately defining the operation profiles of the BT based attack vectors attempting to exploit the known BT vulnerabilities may enable efficient and effective detection of such attack vectors.

Before explaining at least one embodiment in detail, it is to be understood that the embodiments are not necessarily limited in its application to the details of construction and the arrangement of the components and/or methods set forth in the following description and/or illustrated in the drawings and/or the Examples. The embodiments described herein are capable of other embodiments or of being practiced or carried out in various ways.

As will be appreciated by one skilled in the art, aspects of embodiments described herein may be embodied as a system, method or computer program product. Accordingly, aspects of embodiments described herein may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of embodiments described herein may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of embodiments described herein may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of some embodiments described herein.

Aspects of some embodiments described herein are described herein with reference to flowchart illustrations and/or block diagrams of methods, apparatus (systems), and computer program products according to embodiments described herein. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is an exemplary process executed by a BT proxy device to detect and mitigate BT based attacks targeting one or more vulnerable BT devices, according to some embodiments described herein.

An exemplary process 100 may be executed by a BT proxy device deployed to seamlessly connect to two BT devices paired with each other via a BT link and imitating to each of the two BT devices as the other BT device monitor all BT traffic (packets) exchanged between the two BT devices.

In particular, the BT proxy device may analyze, in real-time, BT packets exchanged between the two BT device to identify potential exploitations of BT vulnerabilities and/or attack vectors initiated by one of the BT devices which may be malicious or maliciously compromised in attempt to compromise the other BT device.

Figure 2:
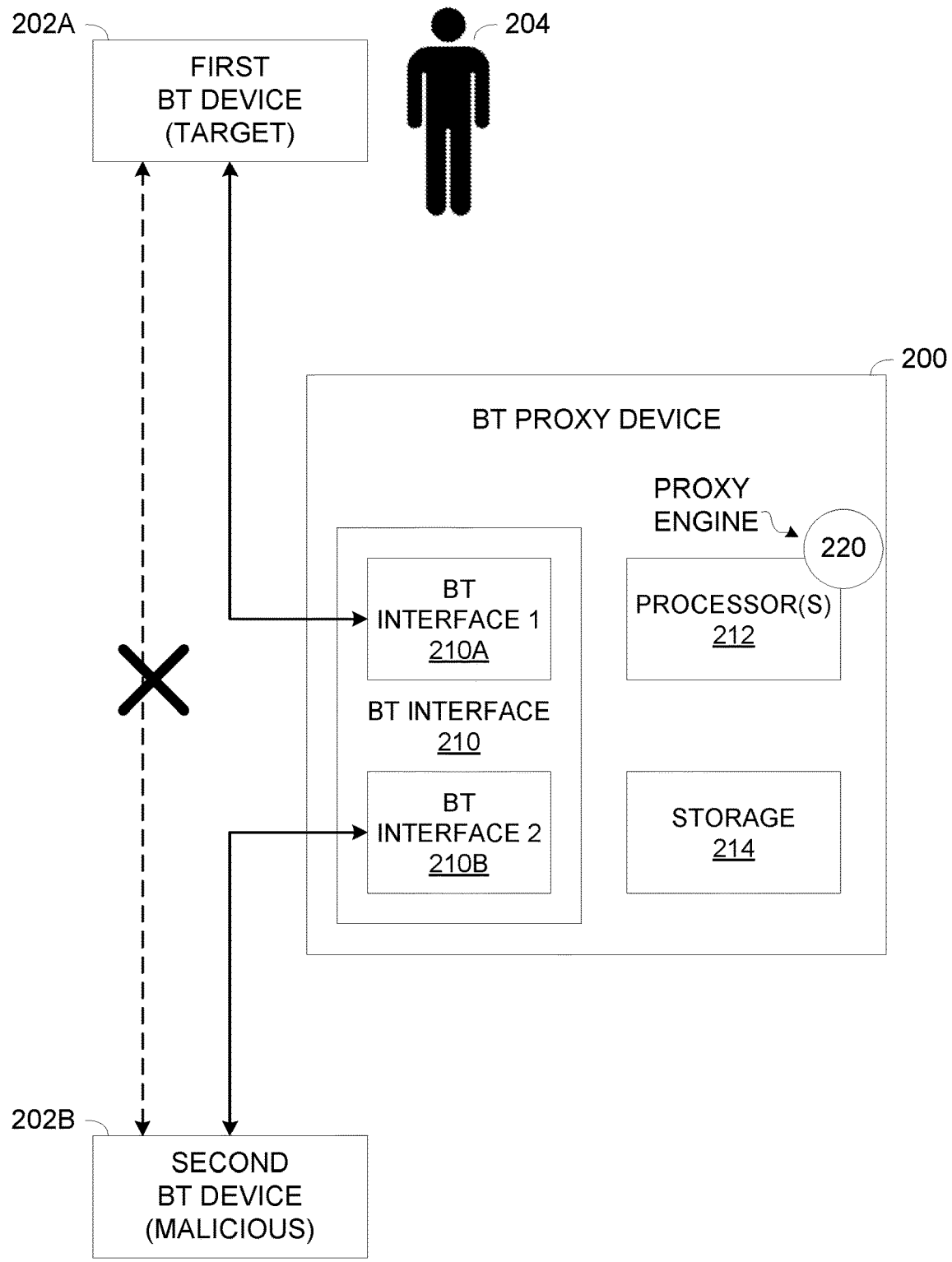
FIG. 2 is a schematic illustration of an exemplary system for detecting and mitigating BT based attacks targeting one or more vulnerable BT devices, according to some embodiments described herein.

Reference is also made to FIG. 2, which is a schematic illustration of an exemplary system for detecting and mitigating BT based attacks targeting one or more vulnerable BT devices, according to some embodiments described herein.

An exemplary BT proxy device 200 may be deployed to monitor BT traffic exchanged over a BT link established between a first BT device 202A and a second BT device 202B which may include practically any device supporting BT connectivity, for example, a cellular phone, a laptop, an In-Vehicle Infotainment (IVI) system, a wearable device (e.g. Smartwatch, etc.), and/or the like.

It is assumed that at least one of the BT devices 202A and 202B may be potentially malicious and/or maliciously compromised and may attempt to compromise the other BT device.

For brevity, the second BT device 202B is assumed to be potentially malicious and may attempt to initiate one or more attack vectors via the BT link in attempt to compromise the first BT device 202A which may be therefore regraded as a target. This however, should not be construed as limiting since obviously the first BT device 202A may be the potentially malicious device while the second BT device 202B may be the target. In addition, it is possible that both BT devices 202A and 2302B are potentially malicious and may each try to compromise its paired BT device.

In particular, the second BT device 202B may attempt to compromise the first BT device 202A in order to gain access to private data and/or resources of and/or relating to a user 204 associated with the first BT device 202A and/or using it. For example, the second BT device 202B may compromise the first BT device 202A in order to obtain private, sensitive and/or secure data relating to user 204. In another example, the second BT device 202B may compromise the first BT device 202A in order to steal the identity of the user 204 and impersonate as the user 204 to gain access and takeover one or more online accounts of the user 204.

The first BT device 202A and second BT device 202B may each comprise one or more processor capable of executing program instructions stored in their storage, for example, volatile memory, persistent memory and/or the like. Moreover, the first BT device 202A and second BT device 202B may execute an Operating System (OS), for example, Android, iOS, and/or the like. Furthermore, the OS execute by the first and second BT devices 202A and 202B may typically support load and execution of software modules, for example, mobile applications downloaded from one or more software repositories, for example, google play, Samsung Galaxy store, Amazon Appstore. Apple Store and/or the like.

The second BT device 202B which is assumed to be malicious may therefore execute malicious software code (program instructions), configured and/or operated to initiate one or more attack vectors towards the first BT device 202A. The malicious software code may be embedded, for example, in one or more malicious software modules. In another example, the malicious software code may be embedded in one or more webpages of one or more websites rendered by the second BT device 202B.

The malicious software module(s) may be loaded to the second BT device 202B using one or more techniques. For example, the second BT device 202B may be a malicious device from the very beginning and may be preloaded with malicious application(s). In another example, which may be the typical case, the second BT device 202B may be initially innocent but may be compromised and infiltrated by one or more malicious software modules comprising malicious code, for example, a malware, a Trojan, an infected and/or engineered mobile application and/or the like loaded into the second BT device 202B, for example, downloaded from the software repository(s). In another example, an initially innocent second BT device 202B may load one or more webpages comprising malicious code.

The term pairing used throughout this disclosure and as known in the art, refers to an initial pairing which is the very first connection made between two BT devices 202, for example, the first and second BT devices 202A and 202B and to subsequent pairing connections between the first and second BT devices 202A and 202B which may occur after the initial pairing. The initial pairing process may therefore take place only once, unless the user 204 explicitly configures the BT device 202, for example, the first BT device 202A to "forget" the second BT device 202B. Following the "forget" action, another initial pairing may be initiated when the two BT device 202A and 202B discover each other.

The OS executed by the first and second BT devices 202A and 202B, for example, Android may potentially comprise one or more BT vulnerabilities which may expose them to major security risks.

One such BT vulnerability which is typical to Android based BT devices 202 is the fact that security provisions and/or access restrictions relating to BT connections are applied only for the initial pairing of two BT devices 202, i.e., the very first time the second BT device 202B pairs with the first BT device 202A. After the first BT device 202A and the second BT device 202B are paired, the Android OS may not enforce additional security restrictions for subsequent BT connections and data transfer between the first and second BT devices 202A and 202B.

For example, when the second BT device 202B requests to pair with the first BT device 202A for the very first time, the Android OS executed by the first BT device 202A, and optionally the OS executed by the second BT device 202B, may prompt the user 204 with a request to grant permission (authorize) for the first BT device 202A to pair and connect with the second BT device 202B.

After the initial pairing, the first BT device 202A may add the second BT device 202B to a list listing all the previously paired BT devices, i.e., the BT devices approved by the user 204. The paired devices list may comprise, for example, the device names of the previously paired BT devices where the device name of each BT device is the name the respective BT device broadcasts to be detected and identified as known in the art.

The first BT device 202A and the second BT device 202B may naturally engage in a plurality of subsequent pair connections after disconnecting, for example, when moving out of BT range from each other. However, whenever re-entering each other's BT transmission range, the first BT device 202A may discover the second BT device 202B and, since the second BT device 202B is logged in the paired devices list of the first BT device 202A, the first BT device 202A may automatically pair and connect with the second BT device 202B without informing the user 204 or requesting his permission.

A second major BT vulnerability of the Android OS is the fact that BT connections are managed globally for all applications executed by the BT device rather than per application basis. Ibis means that in case the first BT device 202A was initially paired with second BT device 202B for legitimate purposes, i.e. the BT link established between the first and second BT devices 202A and 202B was used by one or more legitimate applications, the paired devices list of the first BT device 202A is updated accordingly to list the second BT device 202B as a paired BT device with no mention of the application using the BT link. Therefore, once the second BT device 202B is listed in the paired devices list of the first BT device 202A any application executed by the second BT device 202B, including malicious applications and/or malicious code, may connect and exchange data with the first BT device 202A without informing the user 204 or requesting his permission.

Another BT vulnerability existing in the Android OS is that paired BT devices 202, for example, the first and second BT devices 202A and 202B may automatically open any type of BT logical channel with each other without explicit consent of the user 204 and in fact without even notifying the user 204. As known in the art, BT devices paired via a BT link may open one or more logical channels with each other, optionally multiple logical channels simultaneously. Each logical channel may be directed for different data transfer and/or exchange. For example, a first logical channel may be opened between the first and second BT devices 202A and 202B for voice data transfer, for example, music, video soundtrack, and/or the like while a second logical channel may be opened between the two BT devices 202A and 202B for transferring call data, i.e., voice and a third logical channel may be opened between them for transferring data, for example, text messages, SMS messages, contact information, calls history (log) and/or the like.

Therefore, in order to exploit the BT vulnerabilities and launch one or more BT based attack vectors on the first BT device 202A without alerting the user 204 or raising his suspicion, the second BT device 202B should be paired with the first BT device 202A.

The most common malicious attack may be based on compromising one or more BT devices 202, for example, the second BT device 202B which are paired with the first BT device 202A and are thus listed in the paired devices list of the first BT device 202A. For example, the second BT device 202B may be an Android based IVI system executing a malicious mobile application configured to initiate one or more BT based attack vectors in attempt to compromise the first BT device 202A, for example, a cellular phone of the user 204 located in the vehicle, for example, a driver, a passenger and/or the like. In such case, the Android based IVI system which was initially innocent may be itself compromised after downloading and executing one or more malicious applications.

However, while less common, it is also possible that the malicious attack may be based on operating the second BT device 202B to assume the identity and impersonate as another BT device listed in the paired devices list of the first BT device 202A. For example, assuming a certain BT device is listed in the paired devices list of the first BT device 202A with the name "DEV_123". Assuming the, certain BT device is not currently paired with the first BT device 202A, the second BT device 202B may attempt to pair and connect with the first BT device 202A using the device name "DEV_123". The methods of how the second BT device 202B obtains the device name(s) of BT devices paired with the first BT device 202A are beyond the scope of this disclosure.

Figure 3A:
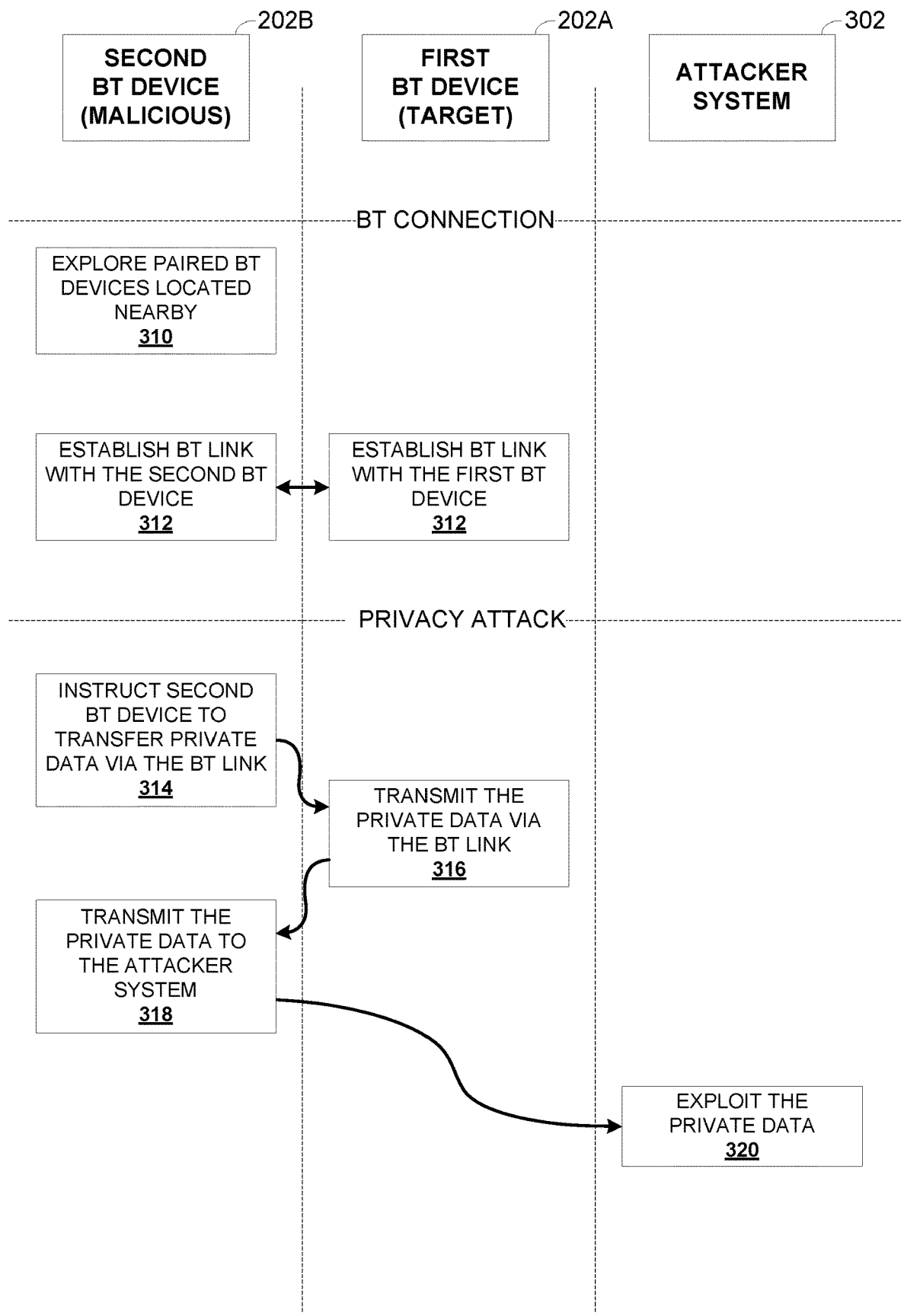
FIG. 3A and FIG. 3B are schematic illustrations of a BT based privacy attack vector.
Figure 3B:
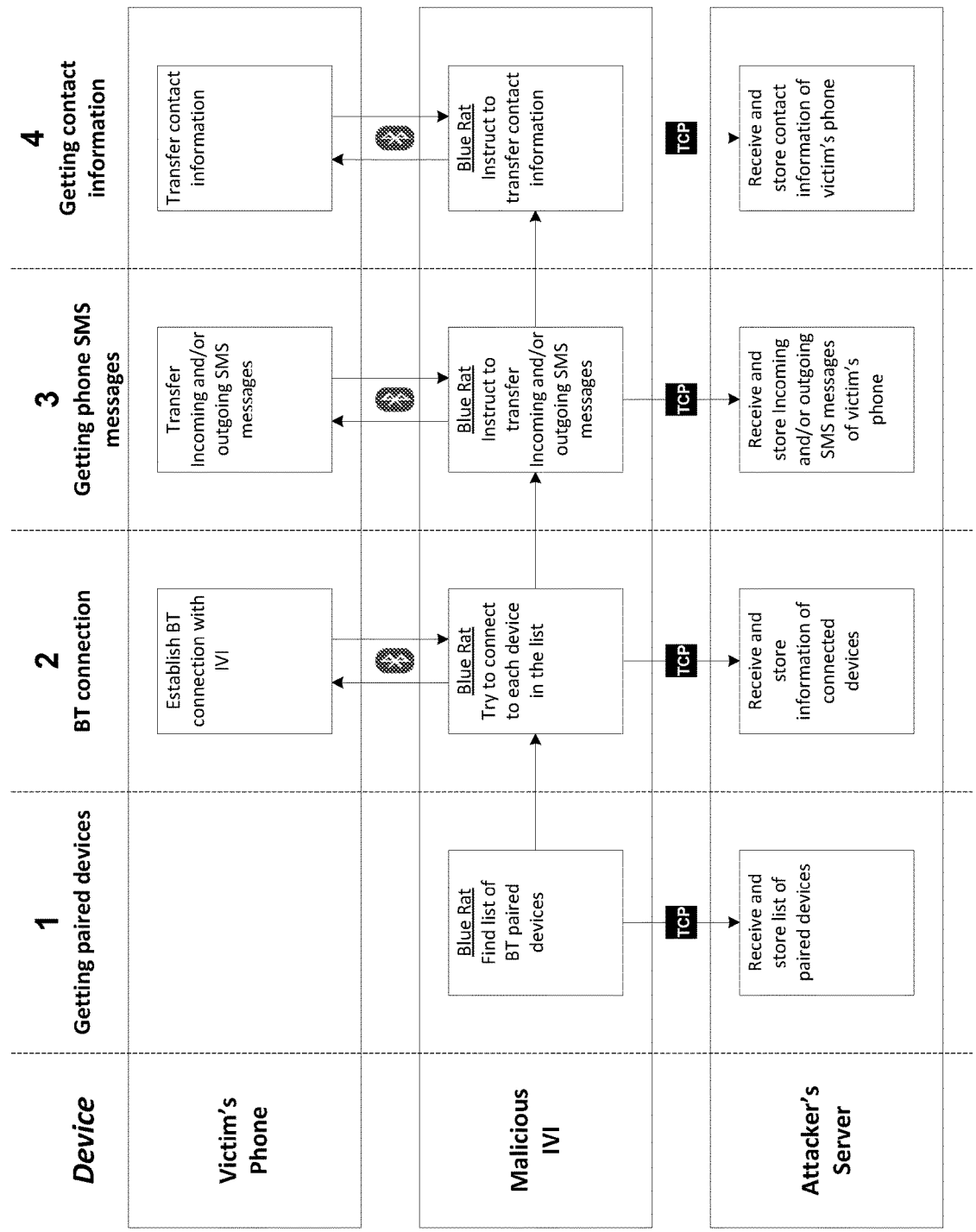

Reference is now made to FIG. 3A and FIG. 3B, which are schematic illustrations of a BT based privacy attack vector.

FIG. 3A presents an exemplary privacy attack vector initiated by a BT device such as the second BT device 202B in attempt to extract private, sensitive and/or secure data from a paired BT device such as the first BT device 202A. The private data may include one or more private data items, for example, a contact information, a call log, content of a Short Message Service (SMS) messages, and/or the like.

In the first phase, the second BT device 202B operated by a malicious attacker may explore (310) the BT medium to detect paired BT devices 202, i.e., BT devices 202 which are listed in the paired devices list of the second BT device 202B and are located within the BT transmission of the second BT device 202B. Assuming the first BT device 202A is located nearby (in BT range), the second BT device 202B may detect the first BT device 202A.

Further assuming that the first BT device 202A is listed in the paired devices list of the second BT device 202B as a paired device, the second BT device 202B may pair (connect), i.e., establish a BT link (312) with the first BT device 202A.

Once paired and connected to the first BT device 202A, the second BT device 202B may initiate the privacy attack by instructing (314) the first BT device 202A, via the BT link, to transfer one or more private data items, for example, contact information of one or more contacts listed in the first BT device 202A, a calls history (call log) of the first BT device 202A, (content of) one or more text messages (e.g. SMS message, instant message, etc.), and/or the like.

In particular, the privacy attack vector initiated by the second BT device 202B may comprises a request transmitted by the second BT device 202B to the first BT device 202A to open one or more logical channels via the BT link for transferring the one or more private data items from the first BT device 202A to the second BT device 202B.

After obtaining the private data from the first BT device 202A, the second BT device 202B may transmit (318) the private data to one or more destinations, for example, one or more attacker systems 302 of the attacker, for example, a server, a device, a cloud computing and/or storage resource and/or the like. The second BT device 202B may transmit the private data to the attacker system 302 via one or more networks, in particular wireless networks, for example, a Wireless Local Area Network (WLAN), e.g., Wi-Fi, a cellular network and/or the like.

The attacker system 302 may exploit (320), i.e., maliciously use the private data extracted from the first BT device 202A for one or more goals.

FIG. 3B presents an exemplary detailed privacy attack conducted by the second BT device 202B exploiting the BT vulnerabilities of the first BT device 202A.

An exemplary second BT device 202B, for example, a malicious IVI system located in a vehicle may launch a privacy attack vector targeting an exemplary first BT device 202A, for example, a phone of a user such as the user 204, for example, a driver and/or passenger in the vehicle designated victim's phone. Specifically, the IVI system may be a compromised by executing one or more malicious applications, for example, Blue Rat application (e.g. APK, etc.) which may have been loaded into the IVI system, for example, downloaded from one of the software repositories.

The compromised IVI system, specifically the Blue Rat malicious application may also communicate with the attacker system 302, for example, an attacker's server and transmit private data extracted from the victim's phone to the attacker's server.

The privacy attack may be directed to obtain private and/or sensitive data from the victim's phone, for example, contact information, call history, SMS messages, and/or the like. Optionally, the privacy attack vector may further comprise deleting one or more data items from the victim's phone, for example, an SMS message and/or the like.

As seen in stage (1), the Blue Rat malicious application executed by the compromised IVI system may access the paired devices list of the IVI system. The Blue Rat application may further transmit the paired devices list of the IVI system to the attacker's server via one or more wired and/or wireless networks for example, WLAN, cellular network and/or the like using one or more communication protocols, for example, Transmission Control Protocol (TCP), User Datagram Protocol (UDP), and/or the like.

In stage (2), the Blue Rat application may explore the BT medium in attempt to discover BT devices listed in the paired device list of the IVI system which are located nearby, i.e., in the BT transmission range. The Blue Rat application may further try to establish a BT link and connect with one or more of the discovered BT devices 202. For example, assuming the victim's phone is located in close proximity to the IVI system, for example, in the vehicle, the IVI system may establish a BT link with the victim's phone. The Blue Rat application may further transmit information of the paired BT devices 202 to the attacker's server, for example, a device name, a device type, and/or the like of one or more of the connected BT devices 202, for example, the victim's phone.

In stage (3), the Blue Rat application may instruct the victim's phone to transfer one or more SMS message logged in the victim's phone, for example, an outgoing SMS message, an incoming SMS messages, and/or the like to the IVI system via the BT link. To facilitate this action, the Blue Rat application may open one or more logical channels via the BT link connecting the IVI system and the victim's phone for transferring the SMS message(s) from the victim's phone to the IVI system. The Blue Rat application may then transmit the SMS messages retrieved from the victim's phone to the attacker's server, for example, via TCP.

In stage (4), the Blue Rat application may instruct the victim's phone to transfer information of one or more contacts listed in the victim's phone to the IVI system via the BT link. The IVI system may optionally open one or more new logical channels via the BT link for transferring the contact information or it may use one or more of the already open logical channel(s). The Blue Rat application may then transmit the contact information retrieved from the victim's phone to the attacker's server, for example, via TCP.

Figure 4A:
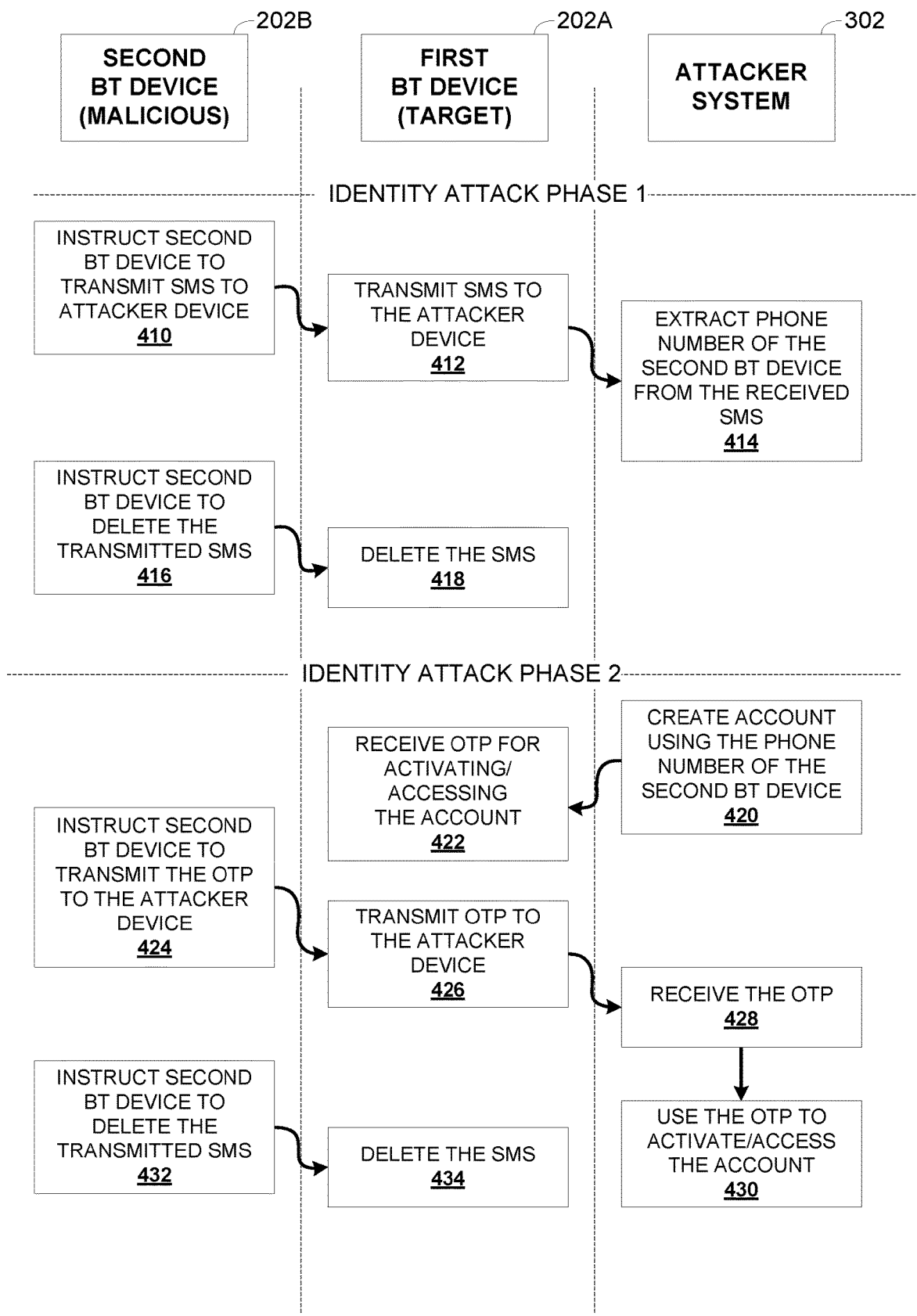
FIG. 4A and FIG. 4B are schematic illustrations of a BT based identity theft attack vector.
Figure 4B:
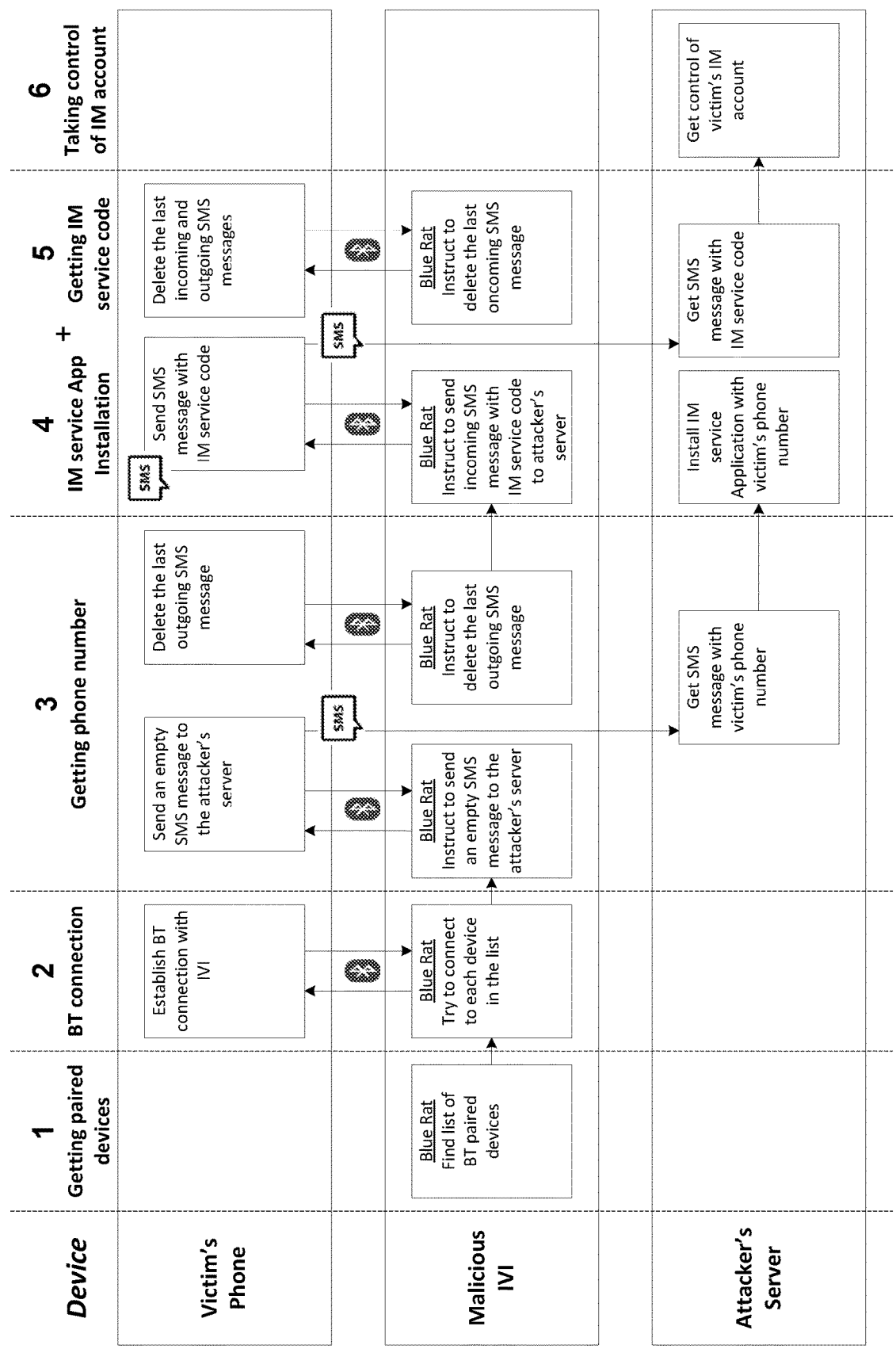

Reference is now made to FIG. 4A and FIG. 4B, which are schematic illustrations of a BT based identity theft attack vector.

FIG. 4A presents an exemplary identity theft attack vector initiated by a BT device such as the second BT device 202B in attempt to steal an identity of a paired BT device such as the first BT device 202A. Using the identity of the first BT device 202A, an attacker system such as the attacker system 302 may impersonate as the first BT device 202A and gain access to one or more restricted (privileged) resources which are accessible to a user such as the user 204 using the first BT device 202A, specifically a cellular device subject to identity authentication.

Such restricted resources which may be accessible only after successfully authenticating the user 204 may include, for example, one or more services such as, for example, an instant messaging service, a texting service, a social network, and/or the like. In another example, the restricted resources may include one or more online accounts accessible after authenticating identify of the user 204 via the first BT device 202A, for example, a bank account, a credit card account, a social network account and/or the like.

The first phase of the identity theft attack may be initiated by the second BT device 202B after completing the BT connection phase described herein before in with respect to FIG. 3A in which the second BT device 202B, which is listed in the paired device list of the first BT device 202A, detects the first BT device 202A and pairs with it via a BT link established to connect the first BT device 202A and the second BT device 202B.

After establishing the BT link with the first BT device 202A, the second BT device 202B may instruct (410) the first BT device 202A to transmit one or more SMS messages to the attacker system 302. The second BT device 202B may further provide a phone number, for example, a Mobile Station International Subscriber Directory Number (MSISDN) of an attacker system such as the attacker system 302 and instruct the first BT device 202A to transmit the SMS message(s) to the phone number of the attacker system 302.

In particular, the privacy attack vector initiated by the first may comprises a request transmitted by the second BT device 202B to the first BT device 202A to open one or more logical channels via the BT link for controlling SMS messages of the first BT device 202A. Controlling the SMS messages of the first BT device 202A may include instructing the first BT device 202A to execute and/or initiate one or more SMS related operations. The SMS related operations may include, for example, transferring to the second BT device 202B one or more SMS messages received by the first BT device 202A, i.e., incoming SMS messages. In another example, the SMS related operations may include transferring to the second BT device 202B one or more SMS messages transmitted by the first BT device 202A, i.e., outgoing SMS messages. In another example, the SMS related operations may include instructing the first BT device 202A to transmit one or more SMS messages to one or more other devices, systems and/or the like. In another example, the SMS related operations may include deleting one or more incoming and/or outgoing SMS messages received and/or transmitted by the first BT device 202A.

In response to the instruction from the second BT device 202B, the first BT device 202A may transmit (412) one or more SMS messages to the attacker's system 302 which may extract (414) the phone number (e.g. MSISDN) of the first BT device 202A from the SMS message(s) and thus obtain the phone number of the first BT device 202A.

In order to avoid detection, the second BT device 202B may further instruct (416) the first BT device 202A to delete the SMS message(s) transmitted to the attacker system 302 in order to remove any trace and/or record of the SMS messages transmitted without permission or even knowledge of the user 204. In response to the delete instruction, the first BT device 202A may delete (418) the SMS message(s) transmitted to the attacker system 302.

Once the attacker system 302 obtains the phone number of the first BT device 202A, the second phase of the identity theft attack vector may be initiated in attempt to steal the identity of the user 204 and impersonate as the user 204 using the first BT device 202A to access one or more restricted resources, for example, one or more accounts of the user 204 in one or more of the online services.

First, the attacker system 302 may create (420) an account in one or more of the restricted resources, for example, one or more of the online services, specifically an online service which applies OTP authentication by transmitting a time limited OTP code to a phone number registered for the account. The attacker system 302 may therefore create the account and try to access it using the phone number of the first BT device 202A.

In response to the access attempt made by the attacker system 302, the online service may transmit one or more SMS messages comprising a time limited OTP to the first BT device 202A which may receive (422) and store the SMS message(s) comprising the OTP code.

The second BT device 202B, which may optionally monitor the incoming SMS messages of first BT device 202A, may instruct (424) the first BT device 202A to transmit the OTP code to the attacker system 302. For example, the second BT device 202B may instruct the first BT device 202A to transmit one or more SMS messages comprising the OTP to the attacker system 302. In another example, the second BT device 202B may instruct the first BT device 202A to transmit the OTP to the attacker system 302 via one or more of the wired and/or wireless networks according to one or more of the communication protocols, for example TCP.

In response to the instruction from the second BT device 202B, the first BT device 202A may transmit (426) the OTP code to the attacker system 302. The attacker system 302 receiving (428) the OTP code may use the OTP code to activate and/or access the online service account (430). Once the attacker system 302 gains access to the account to the user 204, the attacker system 302 may hijack the account and change access information, for example, password, contact phone number, and/or the like thus fully controlling the account of the user 204 while denying access to the account for the user 204.

FIG. 4B presents an exemplary detailed identity theft attack conducted by the second BT device 202B exploiting the BT vulnerabilities in attempt to compromise the first BT device 202A and steal the identity of the user 204.

Continuing the previous example, the malicious IVI system executing the Blue Rat malicious application and thus performing as the second BT device 202B may launch an identity theft attack vector targeting the victim's phone which serves as the first BT device 202A. As described herein before, the compromised IVI system, specifically the Blue Rat malicious application may also communicate with the attacker's server to coordinate the attack vector and/or exchange data.

The identity theft attack may be directed to gain access and hijack one or more accounts of the user 204 in one or more online services requiring authentication of the user 204. The authentication of the user 204 may be done using one or more authentication methods, for example, OTP based authentication using the phone number associated with the user 204 as registered in the account. Such services which use OTP for authentication may include, for example, an Instant Messaging (IM) service account of the user 204. The attack vector may therefore include identifying the phone number of the victim's phone, creating an account using the victim's phone number and acquiring the OTP code transmitted to the victim's phone when the attacker accesses the IM service account of the user 204, i.e., using the phone number of the victim's phone.

As seen in stage (1), the Blue Rat malicious application executed by the compromised IVI system may access the paired devices list of the IVI system.

In stage (2), the Blue Rat application may explore the BT medium in attempt to discover BT devices listed in the paired device list of the IVI system which are located nearby, i.e., in the BT transmission range. The Blue Rat application may further try to establish a BT link and pair with one or more of the discovered BT devices 202. For example, assuming the victim's phone is located in close proximity to the IVI system, for example, in the vehicle, the IVI system may establish a BT link with the victim's phone.

In stage (3), the Blue Rat application may instruct the victim's phone to send one or more SMS messages, for example, null (empty) messages to the attacker's server. The IVI system may therefore provide the phone number of the attacker's server and instruct the victim's phone to transmit the SMS message(s) to the attacker's server's phone number. To facilitate this action, the Blue Rat application may first open one or more logical channels via the BT link connecting the IVI system and the victim's phone for controlling SMS messages of the victim's phone, specifically, for instructing the victim's phone to conduct one or more of the SMS related operations.

In response to the SMS transmission instruction, the victim's phone may transmit one or more empty SMS messages to the attacker server which receives the SMS messages comprising the phone number of the victim's phone and thus acquires the phone number of the victim's phone.

The Blue Rat may further instruct the victim's phone to delete the SMS message(s) transmitted to the attacker's server in order to cover track of the attack vector. The victim's phone deleting the last outgoing SMS message(s) sent to the attacker's system may thus remove the SMS message(s) incriminating evidence.

In phase (4), the attacker's server may install the IM service application using the phone member of the victim's phone. In response to the access attempt of the attacker's server, the IM service may transmit an SMS message to the victim's phone with an OTP that may be valid for a limited time period, for example, one minute.

The Blue Rat application may then instruct the victim's phone to transmit to the attacker's server one or more SMS messages containing the OTP code received from the IM service. The attacker's server now has a valid OTP code for accessing the IM service account of the user 204.

The Blue Rat may further instruct the victim's phone to delete the incoming SMS message received from the IM service and the outgoing SMS comprising the OTP code that was transmitted to the attacker's server in order to remove any trace of the attack. The victim's phone may therefore delete the SMS messages relating to the attack thus ensuring that the user 204 is unaware of the identity theft attack.

The attacker's server which obtained the valid OTP may now access the IM service account of the user 204 and hijack it leaving it completely inaccessible to the user 204.

Reference is made once again to FIG. 2.

The BT proxy device 200 may comprise a BT interface 210, a processor(s) 212 for executing the process 100 and a storage 214 for storing data and/or program code instructions (program store).

In particular, the BT interface 210 may include at least two BT interfaces, a first BT interface 210A and a second BT interface 210B. Via the two BT interfaces 210A and 210B, the BT proxy device 200 may pair and connect to two different BT devices 202. For example, the BT proxy device 200 may connect to the first BT device 202A via the first BT interface 210A and to the second BT device 202B via the second BT interface 210B.

The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a ROM, a Flash array, and/or the like as well as one or more volatile devices, for example, a RAM device, a cache memory and/or the like.

The processor(s) 212 may execute one or more software modules, for example, a process, a script, an application, an agent, a utility, a tool, an OS, a service, a plug-in, an add-on, and/or the like each comprising a plurality of program instructions stored in a non-transitory medium (program store) such as the storage 214 and executed by one or more processors such as the processor(s) 212.

Optionally, the processor(s) 212 includes, utilizes and/or applies one or more hardware elements available in the BT proxy device 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The processor(s) 212 may therefore execute one or more functional modules utilized by one or more software modules, one or more of the hardware modules and/or a combination thereof. For example, the processor(s) 212 may execute a proxy engine 220 configured to execute the process 100.

Reference is made once again to FIG. 1.

As stated herein before, for brevity, the process 100 is described with the first BT device 202A being the target device while the second BT device 202B is the malicious (attacking) device. This however, should not be construed as limiting since the exact same process 100 may be executed for protecting the second BT device 202B from BT based attack vectors initiated by the first BT device 202A and even to detect and mitigate BT based attack vectors initiated from both BT devices 202A and 202B on each other.

Moreover, the process 100 executed by the proxy engine 220 which is in turn executed by the BT proxy device 200 is described for protecting a single BT link between the second BT device 202B and the first BT device 202A. The BT proxy device 200, however, may include additional BT interfaces 210 through which the BT proxy device 200 may connect in between additional pairs of BT devices 202 and execute an independent process 100 for each pair.

As shown at 102, the process 100 starts with the BT proxy device 200, specifically the proxy engine 220 detecting two BT devices 202, for example, the first BT device 202A and the second BT device 202B paired with each other via a BT link.

The fact that the first BT device 202A and second BT device 202B are connected via BT means that the two BT devices are paired with each other and therefore one or more of the BT devices 202, for example, the first BT device 202A may be subject to one or more BT based attack vectors exploiting one or more of the BT vulnerabilities inherent to the OS executed by the first BT device 202A, for example, Android.

In order to protect the first BT device 202A from BT based attack vectors initiated by the second BT device 202B to exploit the BT vulnerabilities of the first BT device 202A, the BT proxy device 200 may seamlessly come in between the first BT device 202A and the second BT device 202B to control the BT link connecting between the first BT device 202A and the second BT device 202B.

As shown at 104, the proxy engine 220 may issue, i.e., transmit a BT link disconnect request to the first BT device 202A requesting to disconnect the BT link connecting between the first BT device 202A and the second BT device 202B.

In particular, the proxy engine 220 may impersonate as the second BT device 202B when transmitting the BT link disconnect request to the first BT device 202A. For example, the proxy engine 220 may use the device name of the second BT device 202B and include it in one or more packets of the BT disconnect request as defined by the BT specification. As such, the first BT device 202A may falsely determine that the BT disconnect request originates from the second BT device 202B and may terminate the BT link with the second BT device 202B.

While requesting the first BT device 202A to terminate the BT link may be sufficient, the proxy engine 220 may also transmit a BT link disconnect request to the second BT device 202B also requesting it to disconnect the BT link connecting with the first BT device 202A.

This time the proxy engine 220 may impersonate as the first BT device 202A, for example, include the device name of the first BT device 202A in the BT disconnect request packet(s) transmitted to the second BT device 202B such that the second BT device 202B falsely determines that the BT disconnect request originates from the first BT device 202A and may terminate accordingly the BT link with the first BT device 202A.

As shown at 106, the proxy engine 220 may pair with the first BT device 202A using the device name of the second BT device 202B such that the first BT device 202A falsely determines that it is paired with the second BT device 2102B.

For example, the proxy engine 220 may include the device name of the second BT device 202B in one or more packets of a BT pair request transmitted to the first BT device 202A as defined by the BT specification. As such, the first BT device 202A may falsely determine that the BT pair (connect) request originates from the second BT device 202B and may establish a BT link accordingly with the BT proxy device 200 under the presumption that the BT proxy device 200 is the second BT device 202B.

As shown at 108, the proxy engine 220 may pair with the second BT device 202B using the device name of the first BT device 202A such that the second BT device 202B falsely determines that it is paired with the first BT device 2102A.

For example, the proxy engine 220 may include the device name of the first BT device 202A in one or more packets of a BT pair request transmitted to the second BT device 202B as defined by the BT specification. As such, the second BT device 202B may falsely determine that the BT pair (connect) request originates from the first BT device 202A and may establish a BT link accordingly with the BT proxy device 200 under the presumption that the BT proxy device 200 is the second BT device 202B.

Since the BT link is a peer to peer connection allowing only two devices to connect via a single BT link, the BT proxy device 200 may connect with the first BT device 202A and with the second BT device 202B via two independent BT links each established using a different one of the BT interfaces 210 of the BT proxy device 200. For example, the BT proxy device 200 may pair and connect to the first BT device 202A via a first BT link established using the first BT interface 210A. The BT proxy device 200 may further pair and connect to the second BT device 202B via a second BT link established using the second BT interface 210B.

As shown at 110, after pairing and connecting to the first and second BT devices 202A and 202B, the BT proxy device 200, specifically the proxy engine 220 may intercept one or more BT packets, and typically every BT packet transmitted from the second BT device 202B to the first BT device 202A and BT packets transmitted from the first BT device 202A to the second BT device 202B.

Since they are oblivious and unware to the fact that they are in fact each connected to the BT proxy device 200, the first and second BT devices 202A and 202B may exchange BT packets with each other via their respective BT links with the BT proxy device 200 under the presumption that they are directly paired with each via a common BT link.

As shown at 112, the proxy engine 220 may analyze one or more of the intercepted BT packets transmitted by (from) the second BT device 202B to the first BT device 202A in order to identify one or more potential attack vectors, specifically BT based attack vectors initiated by the second BT device 202B in attempt to compromise the first BT device 202A.

As described herein before, the proxy engine 220 also intercepts BT packets transmitted by (from) the first BT device 202A to the second BT device 202B. Therefore, to protect the second BT device 202B, the proxy engine 220 may also analyze the BT packets transmitted by the first BT device 202A to identify one or more potential attack vectors, specifically BT based attack vectors initiated by the first BT device 202A in attempt to compromise the second BT device 202B.

The proxy engine 220 may analyze the intercepted BT packets according to one or more BT vulnerability rules defining operations typical to one or more BT based attack vectors exploiting one or more of BT vulnerability of the first BT device 202A, specifically the vulnerabilities of the OS executed by the first BT device 202A, for example, Android.

The proxy engine 220 may therefore analyze one or more of the intercepted BT packets to identify such potentially malicious operations which may be indicative of potential BT based attack vectors.

The vulnerability rules may be directed to detect a plurality of BT based attack vectors, for example, a privacy attack, an identity theft attack and/or the like initiated by the second BT device 202B targeting the first BT device 202A.

For example, an exemplary vulnerability rule directed to BT based privacy attack vectors may define a request to open one or more logical channels for transferring data. The proxy engine 220 may therefore analyze the intercepted BT packet(s) to identify one or more requests transmitted by the second BT device 202B to open logical channel(s) for transferring one or more private data items from the first BT device 202A which may be indicative of a potential attack vector.

Another exemplary privacy vulnerability rule may define a request to transfer multiple private data items from a target BT device, for example, information of multiple contacts, calls history, SMS data and/or the like. Specifically, the privacy vulnerability rule may define a request to transfer multiple seemingly unrelated private data items, for example, both contacts information and SMS data. The proxy engine 220 may therefore analyze the intercepted BT packet(s) to identify requests to transfer of the multiple private data items from the first BT device 202A which may be indicative of a potential attack vector.

Another exemplary privacy vulnerability rule may define a request to delete one or more private data items. The proxy engine 220 may therefore analyze the intercepted BT packet(s) to identify one or more requests transmitted by the second BT device 202B to delete one or more private data items of the first BT device 202A which may be indicative of a potential attack vector.

In another example, an exemplary vulnerability rule directed to BT based identity theft attack vectors may define a request to open one or more logical channels for controlling SMS messages. The proxy engine 220 may therefore analyze the intercepted BT packet(s) to identify one or more requests transmitted by the second BT device 202B to open logical channel(s) for controlling SMS messages, for example, incoming SMS messages, outgoing SMS messages, message drafts and/or the like from the first BT device 202A which may be indicative of a potential attack vector.

Another exemplary identity theft vulnerability rule may define a request to delete one or more SMS messages. The proxy engine 220 may therefore analyze the intercepted BT packet(s) to identify one or more requests transmitted by the second BT device 202B to delete one or more SMS messages of the first BT device 202A which may be indicative of a potential attack vector.

Another exemplary identity theft vulnerability rule may define a request to transmit one or more SMS messages. The proxy engine 220 may therefore analyze the intercepted BT packet(s) to identify one or more requests transmitted by the second BT device 202B instructing the first BT device 202A to transmit one or more SMS messages which may be indicative of a potential attack vector.

Another exemplary identity theft vulnerability rule may define a request to transmit one or more SMS messages very recently received, for example, within the past minute. The proxy engine 220 may therefore analyze the intercepted BT packet(s) to identify one or more requests transmitted by the second BT device 202B instructing the first BT device 202A to transmit one or more SMS messages which were recently received.

The proxy engine 220 may further analyze one or more of the intercepted BT packets transmitted by the second BT device 202B based on one or more connection patterns identified during previous connections between the first BT device 202A and the second BT device 202B.

The proxy engine 220 monitoring the traffic exchanged between the first BT device 202A and the second BT device 202B in the past may identify one or more connection patterns. An exemplary connection pattern may indicate that a single specific logical channel is opened between the first and second BT devices 202A and 202B. Another exemplary connection pattern may indicate that private data is never transferred from the first BT device 202A to the second BT device 202B. Another exemplary connection pattern may indicate that only certain private data is transferred from the first BT device 202A to the second BT device 202B, for example, contacts information. Another exemplary connection pattern may indicate that the second BT device 202B never instructs the first BT device 202A to transmit SMS messages.

The proxy engine 220 may therefore analyze the BT packet(s) exchanged between the first and second BT devices 202A and 202B to identify the connection patterns, and more accurately to identify deviation from the connection patterns which may be indicative of one or more potential attack vectors.

As shown at 114, which is a conditional step, in case, based on the analysis of the intercepted BT packet(s), the proxy engine 220 does not detect any potential BT based attack vector, the process 100 may branch to 116. However, in case the proxy engine 220 determines that the second BT device 202B attempts to initiate a BT based attack on the first BT device 202A, the process 100 may branch to 118.

As shown at 116, since no potential BT based attack vector was detected, the proxy engine 220 may forward each intercepted BT packet to its destination. As such, BT packets transmitted by the second BT device 202B to the first BT device 202A may be forwarded (transmitted) to the first BT device 202A and vice versa, BT packets transmitted by the first BT device 202A to the second BT device 202B may be forwarded to the second BT device 202B.

As shown at 118, since the proxy engine 220 determines or suspects that one or more potential BT based attack vectors may be initiated by the second BT device 202B towards the target first BT device 202A, the proxy engine 220 may initiate one or more actions.

For example, the proxy engine 220 may block one or more of the BT packets transmitted from the second BT device 202B and prevent them from going to the first BT device 202A.

In another example, the proxy engine 220 may generate one or more alerts indicating detection of one or more potential attack vectors based on the analysis of the BT packet(s) exchanged between the second BT device 202B and first BT device 202A. For example, the proxy engine 220 may transmit one or more alert BT packets to the first BT device 202A via the first BT interface 210A alerting the first BT device 202A about detection of the potential attack vector(s). The first BT device 202A may further alert the user 204 of the potential attack vector(s). In another example, assuming the BT proxy device 200 comprises a user interface providing one or more Human Machine Interfaces (HMI), for example, a screen, a speaker, an indication light (e.g. LED) and/or the like, the proxy engine 220 may operate one or more of the HMI interfaces to alert and/or indicate the user 204 about detection of the potential attack vector(s).

According to some embodiments described herein, code analysis may be applied offline to analyze software modules executed by one or more BT devices in order to identify one or more potential BT based attack vectors exploiting one or more of the BT vulnerabilities inherent to the OS executed by the BT devices in attempt to compromise the BT devices.

Figure 5:
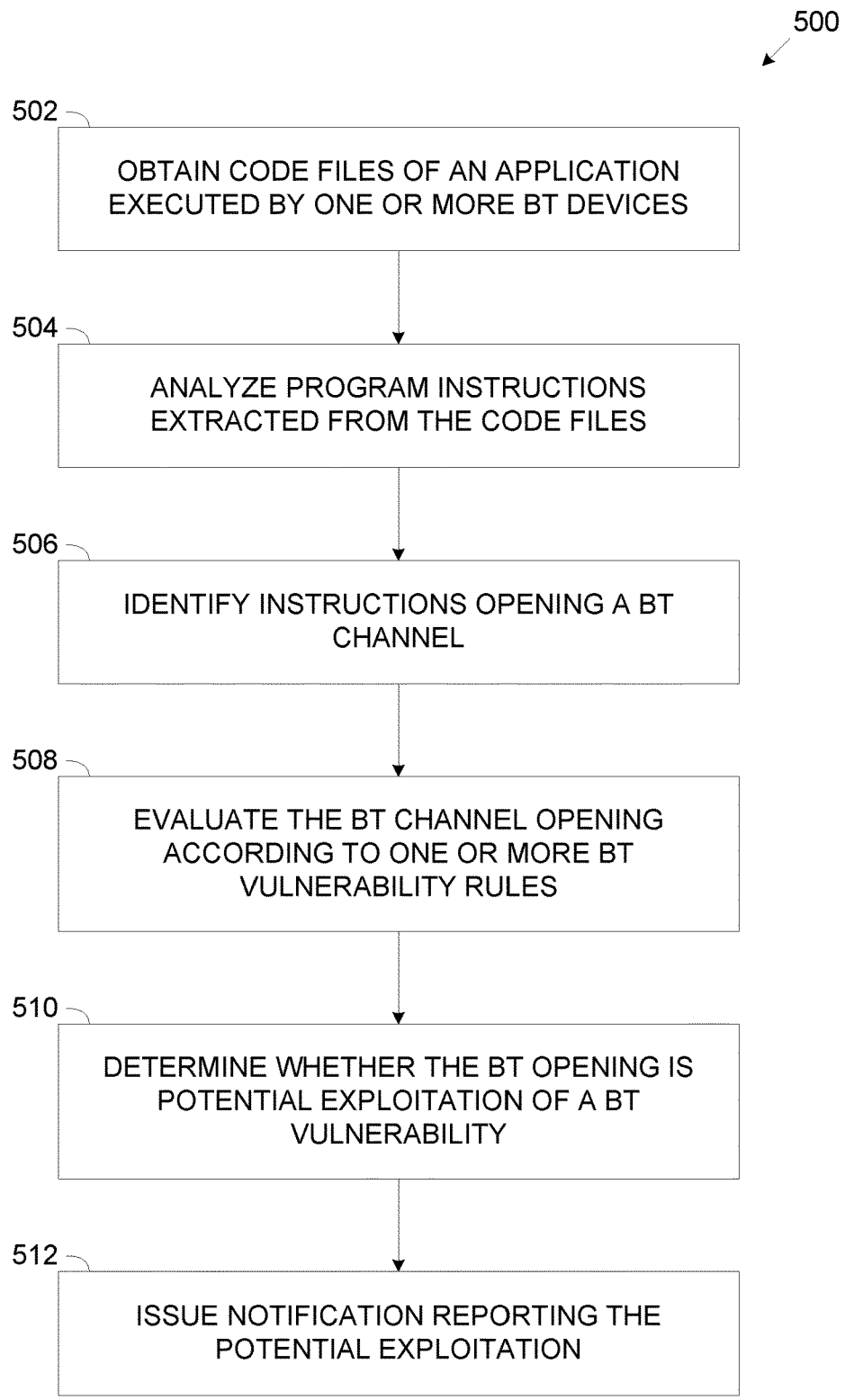
FIG. 5 is a flowchart of an exemplary process of analyzing application program code executed by BT devices to identify potential exploitations of BT vulnerabilities, according to some embodiments described herein.
Figure 6:
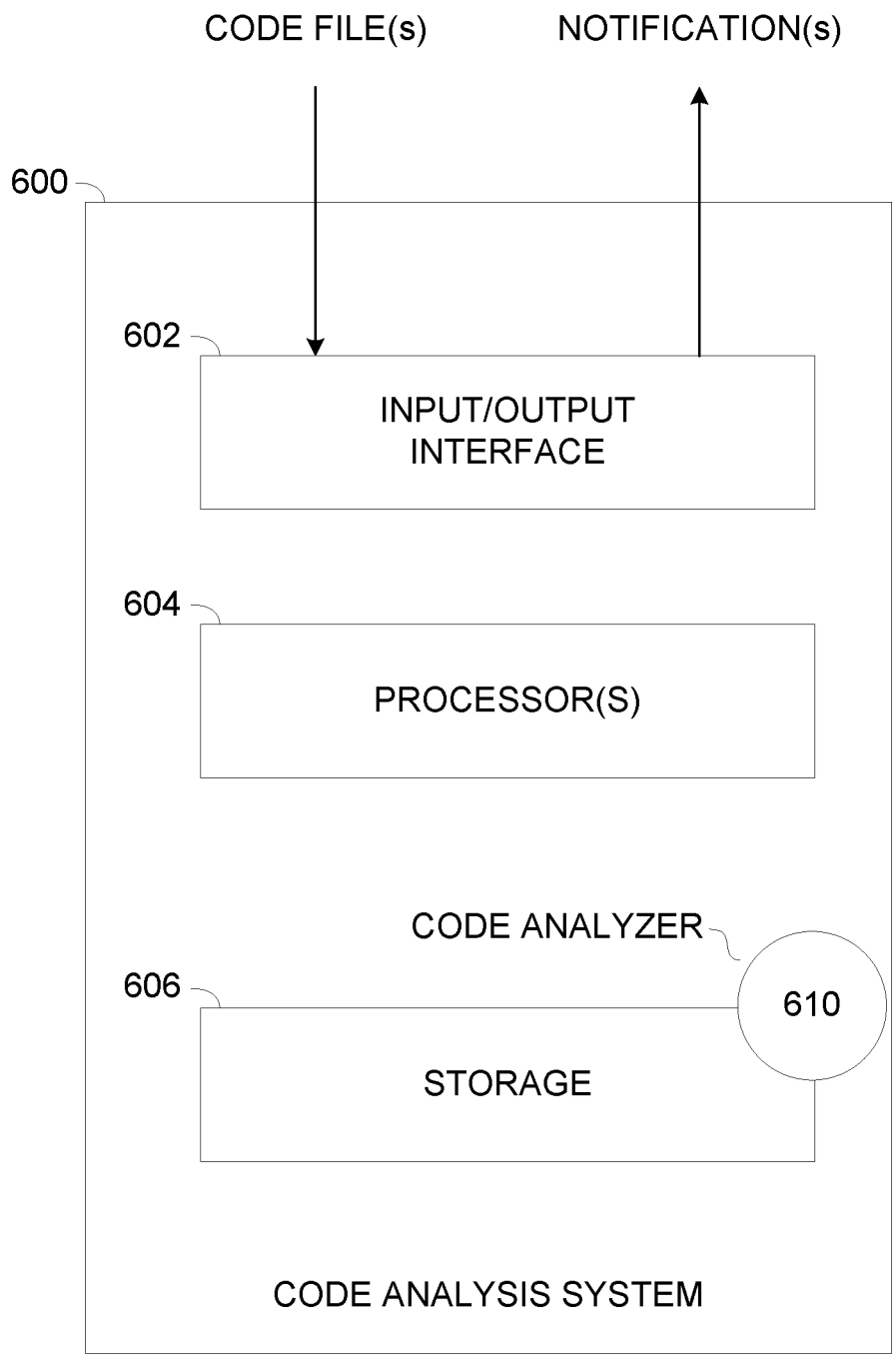
FIG. 6 is a schematic illustration of an exemplary system for analyzing application program code executed by BT devices to identify potential exploitations of BT vulnerabilities, according to some embodiments described herein.

Reference is now made to FIG. 5, which is a flowchart of an exemplary process of analyzing application program code executed by BT devices to identify potential exploitations of BT vulnerabilities, according to some embodiments described herein. Reference is also made to FIG. 6, which is a schematic illustration of an exemplary system for analyzing application program code executed by BT devices to identify potential exploitations of BT vulnerabilities, according to some embodiments described herein.

An exemplary process 500 may be executed by an exemplary code analysis system 600 to analyze one or more software modules in order to detect program instructions configured to initiate one or more BT based attack vectors.

The code analysis system 600, for example, a computer, a server, a computing node, a cluster of computing nodes and/or the like may include an Input/Output (I/O) interface 602, a processor(s) 604 for executing the process 500 and a storage 606 for storing code (program store) and/or data.

The I/O interface 602 may include one or more network interfaces for connecting to one or more wired and/or wireless networks, for example, a Local Area Network (LAN), a Wide Area Network (WAN), a Municipal Area Network (MAN), a cellular network, the internet and/or the like. The I/O interface 602 may further include one or more interfaces, for example, a Universal Serial Bus (USB), an attachable storage interface and/or the like for connecting to one or more local resources, for example, an external disk drive, another computing device and/or the like.

The processor(s) 604, homogenous or heterogeneous, may include one or more processing nodes arranged for parallel processing, as clusters and/or as one or more multi core processor(s). The storage 606 used for storing data and/or program code may include one or more non-transitory memory devices, either persistent non-volatile devices, for example, a ROM device, a hard drive, a solid state drive (SSD), a magnetic disk, a Flash array and/or the like and/or volatile devices, for example, a RAM device, a cache memory and/or the like. The storage 606 may further comprise one or more local and/or remote network storage resources, for example, a storage server, a Network Attached Storage (NAS), a network drive, and/or the like accessible via one or more networks through the I/O interface 602.

Through the I/O interface 602, the code analysis system 600 may obtain, for example, receive, fetch and/or retrieve one or more code files of one or more software modules, for example, a script, an application, an agent, a utility, a tool, an OS, a plug-in, an add-on, and/or the like, collectively designated applications herein after. For example, the code analysis system 600 may be connected to one or more wired and/or wireless networks via the I/O interface 602 and may receive one or more code files from one or more remote network resources via the network(s). In another example, the code analysis system 600 may be retrieve one or more code files from one or more attachable storage devices (e.g. memory stick, etc.) connected to one or more interfaces of the I/O interface 602.

The processor(s) 604 may execute one or more software modules each comprising a plurality of program instructions stored in a non-transitory medium such as the storage 606 and executed by one or more processors such as the processor(s) 604. Optionally, the processor(s) 612 includes, utilizes and/or applies one or more hardware elements available in the code analysis system 600, for example, a circuit, a component, an IC, an ASIC, an FPGA, a DSP, a GPU and/or the like. The processor(s) 604 may therefore execute one or more functional modules utilized by one or more software modules, one or more of the hardware modules and/or a combination thereof. For example, the processor(s) 604 may execute a code analyzer 610 configured to execute the process 500.

Optionally, the code analysis system 600 and/or the code analyzer 610 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

As shown at 102, the process 100 starts with the code analyzer 610 obtaining one or more code files of one or more applications executed by one or more BT devices.

The code files of the application(s) may be received in one or more of a plurality of code formats. For example, the code file(s) may comprise one or more source code files each comprising a plurality of program instructions. In another example, the code file(s) may comprise one or more intermediate files generated by one or more compilers from one or more source code files, for example, an object file, a binary file, an archive file and/or the like. In another example, the code file(s) may comprise one or more executable files, i.e., binary files comprising machine code.

For example, the code files may include one or more APKs executable by one or more version and/or variants of the Android OS witch is highly popular and installed in a wide range of BT devices.

As show at 504, the code analyzer 610 may analyze the program instructions extracted from the code file(s) of the application(s).

The code analyzer 610 may apply one or more tools as known in the art to extract the program instructions from the code files. For example, while it may trivial to extract the program instructions from source code file(s), the code analyzer 610 may apply one or more intermediate code analysis tools known in the art to extract program instructions from one or more code file(s) received in intermediate file format. In another example, the code analyzer 610 may apply one or more binary code analysis tools known in the art to extract program instructions from one or more code file(s) received in executable and/or binary format.

As shown at 506, the code analyzer 610 may identify program instructions relating to BT activity, for example, program instructions configured to open one or more logical channels via one or more BT links established between the BT device and one or more other BT devices.

As shown at 508, the code analyzer 610 may evaluate the opening of the logical channel(s) according to one or more of the BT vulnerability rules, for example, the privacy vulnerability rules, the identity theft vulnerability rule, and/or the like.

For example, the code analyzer 610 may evaluate one or more instances of opening logical channel(s) with respect to the exemplary vulnerability rule defining the opening of the logical channel(s) for transferring private data form the paired BT device and further according to the exemplary privacy vulnerability rule defining transfer of multiple private data items.

In another example, the code analyzer 610 may evaluate one or more instances of opening logical channel(s) and requesting the paired BT device to delete one or more private data items with respect to the exemplary vulnerability rule defining the deletion of private data items.

In another example, the code analyzer 610 may evaluate one or more instances of opening logical channel(s) and requesting the paired BT device to transfer, transmit and/or delete one or more SMS messages of the paired BT device (e.g. incoming and/or outgoing messages) with respect to one or more of the exemplary identity theft vulnerability rules defining requests to open one or more logical channels for controlling the SMS messages.

As shown at 510, the code analyzer 610 may determine, based on the evaluation, whether one or more of the instances of opening one logical channels via BT links connecting to one or more other BT devices present, form and/or pose a potential exploitation one or more BT vulnerabilities, for example, one or more of the BT vulnerabilities of the Android OS.

For example, in case the code analyzer 610 identifies program instructions configured to open one or more logical channels via a BT link with a paired BT device and instruct transfer and/or deletion of one or more private data items of the paired device, the code analyzer 610 may determine that the code file(s) may comprise a potential attack vector. In another example, in case the code analyzer 610 identifies program instructions configured to open one or more logical channels via a BT link with a paired BT device and instruct the paired BT device to transfer, delete and/or transmit one or more SMS messages, the code analyzer 610 may determine that the code file(s) may comprise a potential attack vector.

As shown at 512, the code analyzer 610 may issue one or more notifications to report the potential exploitation of one or more of the BT vulnerabilities determined by the code analyzer 610 based on the evaluation.

The code analyzer 610 may apply one or more methods and/or channels for issuing the notification(s). For example, assuming the code analysis system 600 includes a user interfaces comprising one or more HMI interfaces, for example, a screen, the code analyzer 610 may operate and/or instruct the screen to display one or more notifications of the detected potential attack vector(s) such that one or more operators, users and/or the like of the code analysis system 600 may notice the notification(s). In another example, the code analyzer 610 may transmit one or more notifications of the detected potential attack vector(s) to one or more client devices, for example, a computer, a tablet, a phone and/or the like of one or more of the operators, users and/or the like.

The descriptions of the various embodiments described herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms BT device, and BT logical channel are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of described herein may include a plurality of "optional" features unless such features conflict.

Throughout this application, various embodiments described herein may be presented in a range format. It should be understood that the description in range format is merely for convenience and brevity and should not be construed as an inflexible limitation on the scope of the embodiments described herein. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment described herein may include a plurality of "optional" features unless such features conflict.

It is appreciated that certain features of embodiments described herein, which are, for clarity, described in the context of separate embodiments, may also be provided in combination in a single embodiment. Conversely, various features of embodiments described herein, which are, for brevity, described in the context of a single embodiment, may also be provided separately or in any suitable subcombination or as suitable in any other embodiment described herein. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the embodiments described herein. To the extent that section headings are used, they should not be construed as necessarily limiting. In addition, any priority document(s) of this application is/are hereby incorporated herein by reference in its/their entirety.

What is claimed is:

1. A method of mitigating Bluetooth (BT) based attacks, comprising:
   using at least one processor of a BT proxy device comprising a first and second BT interfaces for:
   identifying a first BT device and a second BT device connected to each other via a BT link;
   transmitting a BT link disconnect to the first BT device while using the device name of the second BT device;
   transmitting a BT link disconnect to the second BT device while using the device name of the first BT device;
   connecting to the first BT device, via the first BT interface, using the device name of the second BT device;
   connecting to the second BT device, via the second BT interface, using the device name of the first BT device;
   intercepting BT packets transmitted, post connection, by the second BT device to the first BT device; and
   detecting at least one potential attack vector based on analysis of at least one of the intercepted BT packets.

2. The method of claim 1, further comprising forwarding the intercepted BT packets to the first BT device in case the at least one potential attack vector is not detected.

3. The method of claim 1, further comprising generating at least one alert indicating detection of the at least one potential attack vector in case the at least one potential attack vector is detected.

4. The method of claim 1, further comprising:
   intercepting BT packets transmitted, post connection, by the first BT device to the second BT device, and
   detecting the at least one potential attack vector based on analysis of at least one of the intercepted BT packet.

5. The method of claim 1, wherein the at least one potential attack vector comprises a request transmitted by the second BT device to open at least one logical channel via the BT link for controlling Short Message Service (SMS) messages of the second BT device.

6. The method of claim 5, wherein controlling SMS messages of the second BT device comprise at least one action of a group consisting of: instructing the second BT device to transfer at least one SMS message received by the second BT device, instructing the second BT device to delete at least one SMS message received by the second BT device, instructing the second BT device to transmit at least one SMS message, and instructing the second BT device to delete at least one SMS message transmitted by the second BT device.

7. The method of claim 1, wherein the at least one potential attack vector comprises a request transmitted by the second BT device to open at least one logical channel via the BT link for transferring at least one private data item from the second BT device.

8. The method of claim 7, wherein the at least one private data item comprises at least member of a group consisting of: a contact information, and a call log.

9. The method of claim 1, wherein the analysis of the BT packets is conducted according to at least one BT vulnerability rule defining operations typical to potential exploitation of at least one BT vulnerability of the first BT device.

10. The method of claim 9, wherein the at least one BT vulnerability rule comprises a request to control at least one SMS message of the first BT device.

11. The method of claim 9, wherein the at least one BT vulnerability rule comprises a request to open transfer at least one private data item from the first BT device.

12. The method of claim 1, wherein the analysis of the BT packets is conducted based on at least one connection pattern identified during previous connections between the first BT device and the second BT device.

13. The method of claim 1, wherein at least one of the first BT device and the second BT device is an Android based device executing Android OS.

14. A BT proxy device for mitigating Bluetooth (BT) based attacks, comprising:
   a first BT interface;
   a second BT interface; and
   at least one processor coupled to the first and second BT interfaces, the at least one processor is adapted to execute code, the code comprising:
   code instructions to identify a first BT device and of a second BT device connected to each other via a BT link;
   code instructions to transmit a BT link disconnect to the first BT device while using the device name of the second BT device;
   code instructions to transmit a BT link disconnect to the second BT device while using the device name of the first BT device;
   code instructions to connect to the first BT device, via the first BT interface, using the device name of the second BT device;
   code instructions to connect to the second BT device, via the second BT interface, using the device name of the first BT device;
   code instructions to intercept BT packets transmitted, post connection, by the second BT device to the first BT device; and
   code instructions to detect at least one potential attack vector based on analysis of at least one of the intercepted BT packets.

* * * * *